Jan. 3, 1933.     T. S. WEST     1,893,311
PROCESS OF LOCATING BURIED PIPE LINES, ETC
Filed July 28, 1932
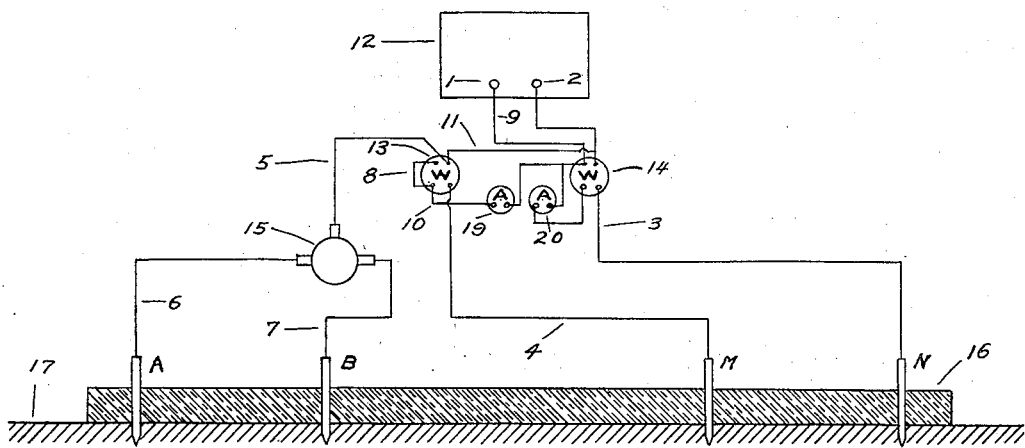
INVENTOR
Thomas S West Patented Jan. 3, 1933

1,893,311

UNITED STATES PATENT OFFICE

THOMAS S. WEST, OF NOWATA, OKLAHOMA

PROCESS OF LOCATING BURIED PIPE LINES, ETC.

Application filed July 28, 1932. Serial No. 625,336.

My invention relates to electrical circuits generally and the object of my invention is to provide a reliable means for locating pipe lines, cables, or conduits at points where their exact location is not known. This is often necessary in the mapping of underground systems or for determining the point at which digging should be started for making new connections, removing clogged or damaged sections, etc. With slight modifications and change of proportion this invention can be used for the location of subsurface electrical inhomogeneities of any nature.

My invention and its application to the location of a buried pipe is illustrated by the accompanying drawing, Figure 1.

A, B, M, and N are electrodes of any type suitable for making electrical contact with the earth. Viewing the geometrical arrangement of the electrode system from above, the line through A and B may be the same as that through M and N or make any angle with the latter line or intersect it at any point. The most desirable arrangement of electrodes will in general depend upon the depth and nature of the body to be located. To facilitate the movement of A, B, M, and N these electrodes may be mounted along a straight line and rigidly fixed to a non-conducting board 16. 12 is a source of electric current preferably alternating such as would be obtained from a vacuum tube oscillator or a small hand driven generator. Electrode M is connected by means of insulated conductor, 4, through the current coil of wattmeter, 13, through ammeter 19 and conductor 9 to terminal 1 of the source of electric current 12. Electrode N is connected by means of insulated conductor 3, through the current coil of wattmeter 14, ammeter 20, and conductor 9 to terminal 1 of 12. One terminal of the potential coils of wattmeters 13 and 14 are both connected by means of conductor 11 to terminal 2 of 12. The other terminal of the potential coil of wattmeter 13 is connected through conductors 8 and 9 to terminal 1 of 12. The other terminal of the potential coil of wattmeter 14 is directly connected to terminal 1 of 12. 15 is a commutator which is so constructed that as rotated it alternately connects conductors 6 and 7 to conductor 5 which connects through conductor 11 to terminal 2. For convenience, wattmeters 13 and 14, ammeters 19 and 20, and commutator 15 may be mounted in an easily portable case.

For beginning the task of locating a buried pipe line, electrodes A, B, M, and N are pushed into the earth by stepping on board 15, or driven, in the approximate vicinity of the pipe to be located, the line passing through the electrode system being approximately perpendicular to the direction of the pipe line. When all electrodes are in connection with the earth, and commutator 15 turned so as to connect with electrode B, the current flowing from terminal 1 flows through the current coil of wattmeter 14, ammeter 20, conductor 3 to electrode N, and through the earth to electrode B. The remainder of the current flowing from terminal 1 flows through conductor 10, the current coil of wattmeter 13, ammeter 19, conductor 4, electrode M, and through the earth to electrode B. At electrode B the two currents flowing from M and N unite and flow through conductors 7, commutator 15, conductors 5 and 11 to terminal 2 of 12 thus completing the circuit. If commutator 15 is turned so as to connect with conductor 6 and electrode A the conditions of current flow are the same except that the length of the path of current flow through the earth from M and N has increased causing a greater amount of current to flow below a given distance below the surface. If a pipe or body having greater conductivity than the soil is present and nearer M than N, switching from B to A will cause a greater change in resistance of the branch through M than that through N. For a body of greater conductivity than the soil the resistance of the branch through M will decrease more than that of the branch through N, and for a body having a lower conductivity than the soil the result will be the reverse. The maximum change in resistance will occur when M or N is directly over the pipe or body.

With properly calibrated instruments the readings of wattmeters 13 and 14 and ammeters 19 and 20 are sufficient data for calculating the difference in resistance of the two branches of the circuit namely, that through electrodes M and N and the earth to A and B. With the electrode system in contact with the earth connection is first made to electrode B and the difference in resistance of the two branches determined. Commutator 15 is then turned so as to connect with electrode A and the difference of the resistance of the two branches again determined. There will be a normal change in difference of resistance of the two branches because the ratio of the distance from B to M to that from A to M is not equal to the ratio of the distance from B to N to that from A to N. The nature of this variation if first determined experimentally in an area of uniform soil conditions may be applied as a correction. If the change in difference of resistance of the two branches of the circuit is determined a maximum difference will occur when either M or N is over the pipe line or other body. In the case of a body of large extent the maximum change will occur when its edge is approximately underneath the mid-point of the line joining M and N. The relation between the change in difference in resistance and the occurrence of the body is utilized for determining the lateral extent of the body.

The variation in difference of resistance of the two branches may be read directly from a calibrated variable resistance by inserting a variable inductance and calibrated variable resistance in each branch. The inductance and resistance of the two branches are varied by means of the variable inductances and calibrated variable resistances until the reading of ammeter 20 is the same as ammeter 19 and the reading of wattmeter 14 the same as that of wattmeter 13. The difference in required setting with connection to electrode A from that with connection to electrode B of the calibrated variable resistance is a measure of the difference in effect of the pipe or other body upon the two branches. In this case the ammeters and wattmeters merely serve as indicating instruments and may be replaced by any means for indicating the equality of the resistance of the two branches.

In order that the data obtained from various set ups of the electrode system in a given area be comparative, progression is made in the desired direction by placing electrode M at the point which N was driven on the previous set up or vice-versa. The direction of movement may be either in a straight or broken line.

While I have herein shown and described a practical application of my invention, the same is merely illustrative and I contemplate all changes, modifications, applications, and combinations with other methods or apparatus that come within the scope of the claims appended hereto.

I claim:

1. The method of determining the nature and location of buried pipe and similar bodies occurring in the earth which consists of applying electric energy to three separate points or groups of points which are in electrical connection with the earth in such a manner that the electric current flowing from one terminal of the source of electric energy is divided into two branches each one of said branches being electrically connected to one of the aforementioned points or groups of points through a means for determining the difference in electrical resistance of the said branches and in which the current flows from the said points or group of points to which said branches electrically connect with the earth through the earth to the third point or group of points and from there to the opposite terminal of the source of electric power in such a manner that said point or group of points may be moved relative to the other two said points or groups of points thereby causing a shifting of the lines of current flow through the earth and a variation in resistance of the two said branches which is determined by the position of said third point or group of points, the nature of the subsoil, and the occurrence of bodies having a different electrical resistivity from that of associated earth, and the determination from said data of the location and nature of said bodies.

2. The method of determining the nature, location, and extent of subterranean earth strata which consists of maintaining a flow of electric current (either direct or alternating) through the earth by making electrical connection with three points or groups of points which are in electrical connection with points the earth in such a manner that the electric current flowing from one terminal of a source of electrical energy is divided into two branches which consist of a separate electrical connection to each of two of the aforementioned points or groups of points through a means for determining the difference in electrical resistance of the said two branches and the two paths of electric current flow from said two points or groups of points through the earth to said third point or groups of points, the connection of the other terminal of the said source of electric energy to the third of said points or groups of points, the moving of said third point or groups of points relative to the other two said points or groups of points so that the variation of earth resistivity in the vicinity of the said third point or groups of points has an approximately equal effect upon the resistance of the said two branches, the moving of the said third point or groups of points relative to the other two said points or groups of points so that the points, or resulting surfaces, of equal electric current intensity within the earth are shifted in a known and predetermined manner, the determination of the nature, location, and extent of subterranean earth strata by the resulting variation in difference of resistance of the said two branches, and the moving of the said system of three points or groups of points over the area to be investigated in such a manner that all data throughout the area is comparative.

3. The method of determining the nature, extent, and location of inhomogeneities occurring within the earth which consists of applying electric energy to the earth in such a manner that the electric energy from one terminal of a source of electric energy is applied to the earth in two or more points or groups of points through a means of comparing the portions of electric energy supplied to each of the said two or more points or groups of points, the connection of the other terminal of the said source of electric energy to a point or group of points which provides a common conductor or return to the said source of electric energy of the electric energy supplied to the said two or more points or groups of points, the moving of said common point or group of points relative to the said two or more points or groups of points in such a manner as to cause a shifting of the points, or resulting surfaces, of equal electric energy per unit volume within the earth, the determination of the nature, location, and extent of inhomogeneities within the earth by the resulting changes in the portions of electric energy supplied to the said two or more points or groups of points, and the moving of the said system of points or groups of points over the area to be investigated in such a manner that all data obtained by the various determinations is comparative.

THOMAS S. WEST.